(12) United States Patent
Franchet et al.

(10) Patent No.: US 7,431,197 B2
(45) Date of Patent: Oct. 7, 2008

(54) METHOD OF FABRICATING A HOLLOW MECHANICAL PART BY DIFFUSION WELDING AND SUPERPLASTIC FORMING

(75) Inventors: Jean-Michel Franchet, Paris (FR); Gilles Klein, Mery-sur-Oise (FR); Patrick Gesmier, Sannois (FR)

(73) Assignee: SNECMA, Paris (FR)

( * ) Notice: Subject to any disclaimer, the term of this patent is extended or adjusted under 35 U.S.C. 154(b) by 108 days.

(21) Appl. No.: 10/812,969

(22) Filed: Mar. 31, 2004

(65) Prior Publication Data
US 2004/0200887 A1 Oct. 14, 2004

(30) Foreign Application Priority Data
Apr. 10, 2003 (FR) .................................. 03 04443

(51) Int. Cl.
*B23K 20/00* (2006.01)
(52) U.S. Cl. ..................... 228/193; 228/118; 29/889.72
(58) Field of Classification Search ................. 228/182, 228/183, 193, 227, 230, 118; 29/889.2, 889.7, 29/889.72, 889.721, 889.722
See application file for complete search history.

(56) References Cited
U.S. PATENT DOCUMENTS

| | | | | |
|---|---|---|---|---|
| 4,220,276 A | * | 9/1980 | Weisert et al. ............... 228/118 |
| 5,118,026 A | * | 6/1992 | Stacher ........................ 228/157 |
| 5,263,638 A | * | 11/1993 | Douglas ....................... 228/118 |
| 5,316,203 A | | 5/1994 | Rowe et al. |
| 5,513,791 A | | 5/1996 | Rowe et al. |
| 5,530,221 A | * | 6/1996 | Benda et al. ............. 219/121.83 |
| 5,994,666 A | * | 11/1999 | Buldhaupt et al. ...... 219/121.64 |
| 6,068,179 A | * | 5/2000 | Fowler ......................... 228/157 |
| 6,138,898 A | * | 10/2000 | Will et al. ..................... 228/157 |
| 6,419,146 B1 | * | 7/2002 | Buldhaupt et al. ........... 228/193 |
| 6,448,530 B1 | * | 9/2002 | Fujita et al. ............... 219/69.17 |
| 6,641,385 B2 | * | 11/2003 | Fujita et al. .................. 425/380 |
| 6,810,572 B2 | * | 11/2004 | Kistner et al. .................. 29/458 |
| 6,814,926 B2 | * | 11/2004 | Geving et al. .................. 419/5 |
| 6,979,180 B2 | * | 12/2005 | Motherwell ............. 416/229 R |
| 2002/0179688 A1 | * | 12/2002 | Sanders ....................... 228/193 |

FOREIGN PATENT DOCUMENTS

| | | |
|---|---|---|
| EP | 0 849 029 | 6/1998 |
| FR | 2 739 045 | 3/1997 |
| FR | 2 772 021 | 6/1999 |

* cited by examiner

*Primary Examiner*—Kevin P Kerns
*Assistant Examiner*—Michael Aboagye
(74) *Attorney, Agent, or Firm*—Oblon, Spivak, McClelland, Maier & Neustadt, P.C.

(57) ABSTRACT

A method of fabricating a hollow mechanical part includes a step of depositing an anti-diffusion substance in a predefined pattern on at least one face of primary parts to be assembled together. The depositing step is performed by applying a layer of anti-diffusion substance including a powder over a surface of the face of the primary parts; and by localized sintering of the anti-diffusion substance in the predefined pattern by the heating that results from localized application of a laser beam along a track.

27 Claims, 3 Drawing Sheets

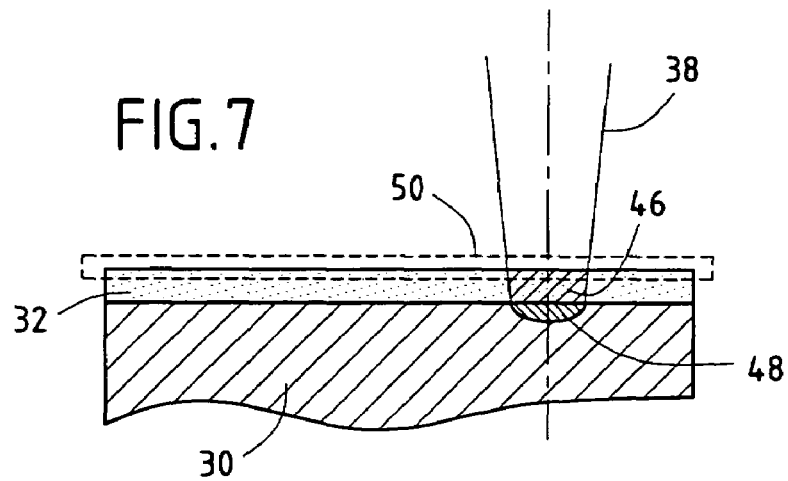
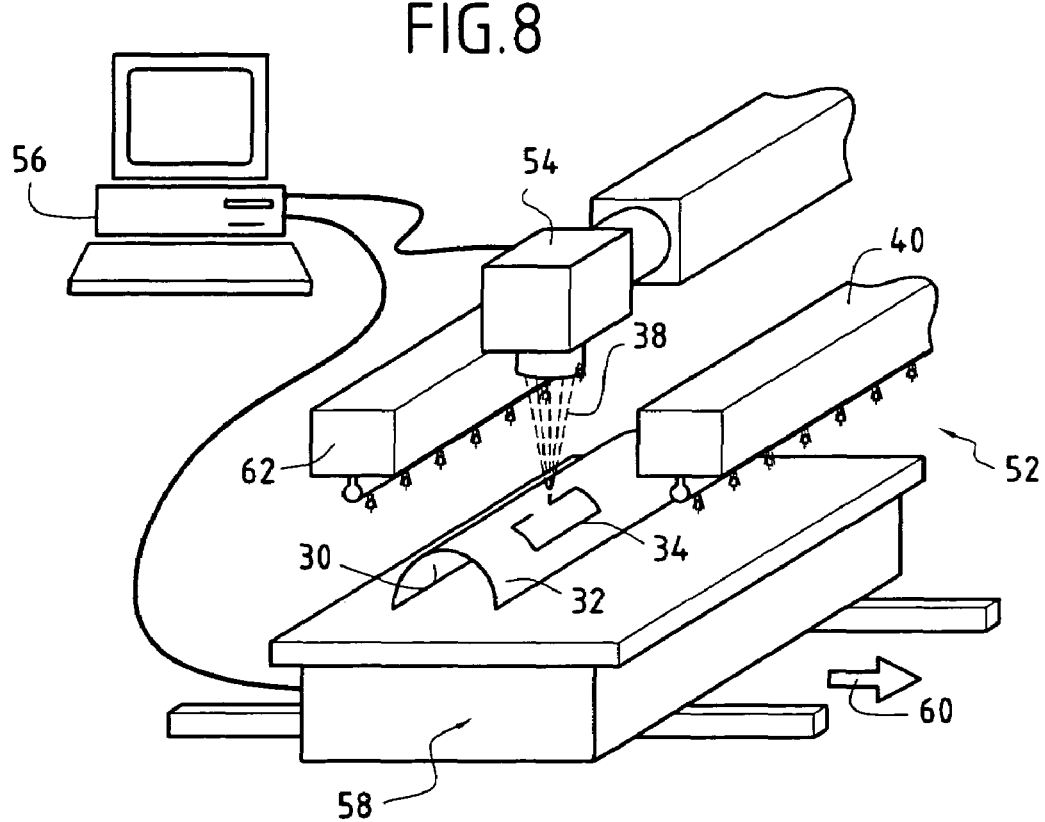

METHOD OF FABRICATING A HOLLOW MECHANICAL PART BY DIFFUSION WELDING AND SUPERPLASTIC FORMING

The invention relates to a method of fabricating a hollow mechanical part by diffusion welding and superplastic forming.

The present invention also relates to making a hollow blade for a turbomachine, in particular a fan rotor blade, in particular a blade of the type having a large chord.

BACKGROUND OF THE INVENTION

It is recalled that the diffusion-welding technique consists in putting two plates of a given material into contact at high temperature under a certain amount of pressure and for a certain length of time. The two plates then become welded together by atomic diffusion, thereby presenting the advantage of forming a bond structure that is equivalent to the base structure of the material.

When diffusion welding is associated with superplastic forming, an anti-diffusion or "stop-off" substance is used to prevent diffusion welding taking place in those zones of the facing faces of the plates that are subsequently to be inflated in order to obtain a hollow mechanical part.

Thus, the anti-diffusion substance forming a diffusion barrier (also known as a stop-off substance) is applied in predefined zones on at least one of the facing faces of the plates of superplastic material so that when the diffusion-welding step has finished the plates are not welded together in the zones covered in the anti-diffusion substance, which substance generally comprises a filler of refractory material that inhibits diffusion of the atoms of the plates that are to be welded together.

The assembly of plates that have been selectively welded together by diffusion welding is generally subsequently subjected to superplastic forming by heating the assembly to a temperature that is compatible with superplastic behavior of the plate material, in a mold that is generally closed. An inert gas is then injected under controlled pressure into the non-welded zones of the assembly, thus enabling the plates to be inflated to match the profile of the mold.

Naturally, the quality of the welding that results from the diffusion-welding step depends on operating parameters: temperature, pressure, and time, and also on parameters associated with the elements that are to be assembled together: metallurgical structure, surface state (cleanness, roughness). Consequently, it is essential to eliminate all sources of contamination on the surfaces to be assembled together prior to raising the temperature in the diffusion-welding step.

This cleaning of the surfaces is conventionally performed by creating a vacuum in the cavity formed by the two surfaces to be welded together. However, when diffusion welding is associated with superplastic forming, an anti-diffusion substance is used, generally comprising an organic binder together with a powder of an anti-diffusion material constituted by a filler of refractory material such as a ceramic (e.g. yttrium oxide, alumina, or boron nitride) or graphite. This anti-diffusion material (or stop off product) inhibits the diffusion of atoms from the material of the plates to be welded together.

After applying the anti-diffusion substance in a predefined pattern corresponding to the zones of the surfaces that are not to be joined together by diffusion welding, the binder is generally degraded so as to retain only the powdered anti-diffusion substance, presenting the anti-diffusion properties.

This application of the anti-diffusion substance is generally performed by the so-called "silkscreen printing" technique which makes use of printing screens each comprising a frame surrounding a mesh through which the fluid to be deposited is caused to pass in a predefined pattern. The mesh is implemented in the form of a stretched web (or cloth) of woven yarn and presents sealed portions that prevent fluid from passing through in zones that are not to be coated in anti-diffusion substance.

That technique presents resolution which depends in particular on the size of the mesh and the diameter of the yarn, where the size of the mesh must be large enough to allow the fluid for deposition to pass through but small enough to avoid jagged-edge phenomena. In addition, the silkscreen printing technique requires a system for positioning the frame relative to the part and for performing multiple adjustments (web tension, distance between the web and the part, . . . ), the silkscreen web suffering wear over time which is revealed by distortion that leads to the deposited patterns shifting.

It will be understood that that technique is relatively awkward to implement, that it gives a result that is not strictly reproducible over time, and that it requires very good control over the viscosity of the anti-diffusion substance.

It is also known to deposit the anti-diffusion substance by spraying through mask, as described in document FR 2 739 045 which relates to a method of manufacturing a hollow blade for a turbomachine. That spraying technique presents the following steps:

a) applying an organic type mask to at least one face of at least one of the primary parts;

b) cutting through the mask with a predefined pattern representing the boundary between the welded and non-welded zones, using a special tool under computer control;

c) peeling off the mask in the zones that are not for welding;

d) cleaning the surfaces;

e) depositing an anti-diffusion substance on the previously prepared surfaces;

f) peeling off the remainder of the mask;

g) pre-baking treatment of the anti-diffusion substance;

h) cleaning and inspecting the surfaces to be welded.

It is observed that step c) of peeling the mask away from the zones that are not to be welded leads to small local tears in the mask, thereby degrading straightness at the edge of the deposit. In addition, the peeling of step f) leads to local zones at the periphery of the deposit being torn away and/or collapsing. These two phenomena therefore contribute to reducing the geometrical accuracy of the deposit, and consequently the quality of the surfaces to be welded. In addition, it is important to control the viscosity of the anti-diffusion substance so that during step e) it covers the previously prepared surfaces properly.

It will thus be understood that that spraying technique is awkward to implement, requires a long time to perform, and leads to a result with imperfections.

Finally, document EP 0 849 029 proposes applying the anti-diffusion substance by direct deposition performed using the fluid jet method. That technique is close to the ink jet method of printing since it uses a print head that moves over the plate under the control of a computer, with fluid being transferred by jets from a tank onto the face of the plate in a predefined pattern.

That technique thus enables the substance to be deposited directly on the part without making use of a silkscreen or a prior step of depositing a mask, thereby simplifying the operation of deposition, and eliminating the step of making, maintaining, and adjusting/inspecting silkscreen frames.

Nevertheless, that direct deposition technique using the fluid jet method requires the viscosity of the fluid forming the anti-diffusion substance to be adjusted accurately, in particular by adding anti-settling and anti-coagulation agents. These added elements generally cause the deposited substance to be contaminating to the surface on which it is deposited, particularly when said surface is made of a titanium-based alloy.

OBJECTS AND SUMMARY OF THE INVENTION

The present invention thus seeks to overcome the drawback of prior art techniques for depositing an anti-diffusion substance, in particular without it being necessary to implement very close control over the viscosity of the anti-diffusion substance.

More precisely, the present invention relates to improving the conditions in which the diffusion-welding step is performed, and in particular the present invention seeks to contribute to eliminating all sources of contamination of the surfaces for assembling together prior to raising them to the diffusion-welding temperature, and in particular eliminating all residues due to degrading the organic binder of the anti-diffusion substance.

The present invention also seeks to enable the anti-diffusion substance to be deposited in predefined patterns in a manner that is simple, reliable, and highly accurate, in particular with patterns that are very sharp along their edges.

In conventional manner, the present invention provides a method of fabricating a hollow mechanical part by diffusion welding and superplastic forming, the method comprising the following steps:

a) providing at least two primary parts of superplastic material;

b) depositing an anti-diffusion substance in a predefined pattern on at least one face of said primary parts;

c) assembling said primary parts together at their periphery, with the exception of a passage-forming location, said primary parts forming a stack and defining between them a cavity, said at least one face, on which the anti-diffusion substance was deposited at step b), being placed facing into said cavity;

d) diffusion welding the stack under isostatic pressure;

e) placing the welded assembly in a mold; and f) raising said mold to the superplastic forming temperature and injecting an inert gas at the superplastic forming pressure via said passage into said cavity, thereby causing the stack to inflate and implementing superplastic forming, enabling a blank of the mechanical part to be obtained.

In order to achieve the above-specified objects, in a manner characteristic of the present invention, step b) is performed in application of the following sequence of operations:

b1) applying a layer of anti-diffusion substance comprising a powder over the entire surface of said at least one face of the primary parts;

b2) localized sintering of the anti-diffusion substance in said predefined pattern by the heating that results from localized application of a laser beam along a track made up of at least one zone, thereby producing, in said at least one zone, both bonds between the particles of powder and also a diffusion phenomenon between the particles of powder and the material of said at least one face of the primary part; and b3) removing the anti-diffusion substance from the regions that are not subjected to the laser beam.

In this way, it will be understood that since the anti-diffusion substance is deposited in the predefined pattern by sintering due to the passage of the laser beam, it is possible to omit precisely adjusting the viscosity of the anti-diffusion substance. Consequently, use of an organic binder is no longer essential, thereby eliminating all of the problems of possibly contaminating the surfaces to be welded with the residues of degrading the organic binder.

Likewise, such a method is easy to implement since it enables the deposition step to be simplified since it is possible to deposit the anti-diffusion substance directly without involving a silkscreen or a layer of masking substance.

Compared with the conventional silkscreen printing technique, this solution thus presents the advantage of eliminating the steps of preparing, maintaining, inspecting and/or adjusting silkscreen frames. Compared with the technique of deposition by the fluid jet method, the present invention does not present any risk of the inking head becoming clogged during printing.

Overall, by means of the method of the present invention, it is possible to obtain good resolution in the definition of the deposited patterns, with very good reproducibility of the deposited shapes due to the resolution and the accuracy with which the laser beam can be controlled, which control is preferably automatic.

Furthermore, it should be understood that sintering enables the anti-diffusion substance to bonded securely to the face(s) concerned of the primary part(s), thereby completely eliminating any risk of anti-diffusion particles migrating into zones which are to be welded together by diffusion welding.

Finally, it should be observed that the laser beam sintering step leads to heating which can serve to degrade the binder, and thus to eliminate it.

The principle of sintering an inorganic powder by laser beam is described in FR 2 772 021 in the context of a marking application, in particular for decorative purposes.

Preferably, said anti-diffusion substance comprises said powder and a binder, and said powder is an anti-diffusion filler constituted by a refractory material comprising at least one of the materials belonging to the group constituted by: yttrium oxide; alumina; graphite; and boron nitride; or any other powder made of a material that is compatible with the substrate.

Preferably, said anti-diffusion filler is a yttrium oxide powder with particles presenting a mean size of less than 50 micrometers (μm).

In a preferred disposition, said binder is not organic, and has an aqueous base, and in particular said binder is water.

Such a binder makes it possible to avoid problems associated with eliminating residues of degrading organic binders. When the binder is water, it is eliminated by being evaporated when the laser beam goes past.

In another preferred disposition, step b1) of applying a layer of anti-diffusion substance is performed by a method known to the person skilled in the art, e.g. spraying, coating, silkscreen printing, etc.

This disposition can be implemented simply by using spray nozzles which spray the anti-diffusion substance directly over the entire surface of said at least one face of the primary parts that are constituted by plates.

In a preferred implementation, sintering step b2) is performed under air, or preferably under a neutral atmosphere (of inert gas), in particular under an atmosphere of argon.

This avoids any risk of contaminating said at least one face of the primary parts constituting the medium on which the anti-diffusion substance is deposited. It has been shown that there is no contamination of the layer of anti-diffusion substance, even when sintering is not performed under a neutral atmosphere, in particular when sintering is performed in air.

Preferably, step b3) of removing the non-sintered substance is performed by a non-abrasive operation so as to avoid damaging the surfaces that are to be welded together by diffusion welding. In particular, in a preferred disposition, step b3) of removing the non-sintered substance is performed by washing, which is very simple to perform. This step b3) of removing the non-sintered substance can also be performed in any other way, in particular mechanically, but non-abrasively, e.g. by brushing.

In another preferred disposition, the laser is directed by means of a system under computer control, as is already known in the field of laser marking.

Advantageously, provision is also made for said control system to begin tracing each zone of the track in a portion of the track that lies within said zone. Thus, any risk of spot defects (which may be due to prolonged application of the laser beam) at the edges of the zones covered in the sintered anti-diffusion substance is avoided, i.e. defects are avoided at the interface between the welded zones and the non-welded zones.

The present invention also provides a method of fabrication as defined above, wherein said mechanical part is a hollow blade for a turbomachine, in particular a fan rotor blade, and wherein three primary parts (in the form of plates) are provided in step a), comprising a suction side primary part, a central sheet, and a pressure side primary part.

BRIEF DESCRIPTION OF THE DRAWINGS

Other advantages and characteristics of the invention will appear on reading the following description given by way of example and made with reference to the accompanying drawings, in which:

FIG. 7 is a cross-section of the primary part in the situation of FIG. 5; and

FIG. 8 is a simplified diagram of the apparatus for implementing deposition of an anti-diffusion substance in a predefined pattern.

MORE DETAILED DESCRIPTION

Figure 1:
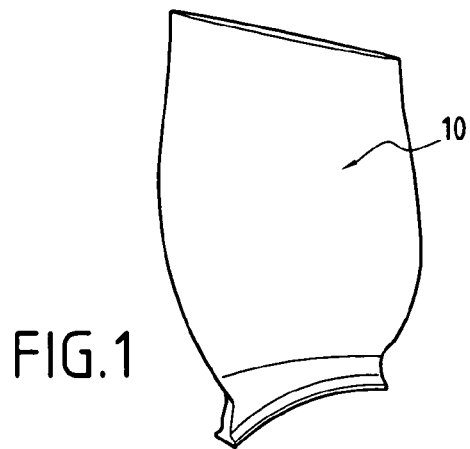
FIG. 1 is a perspective view of a hollow blade for a turbomachine obtained by the method of fabrication of the invention.
Figure 2:
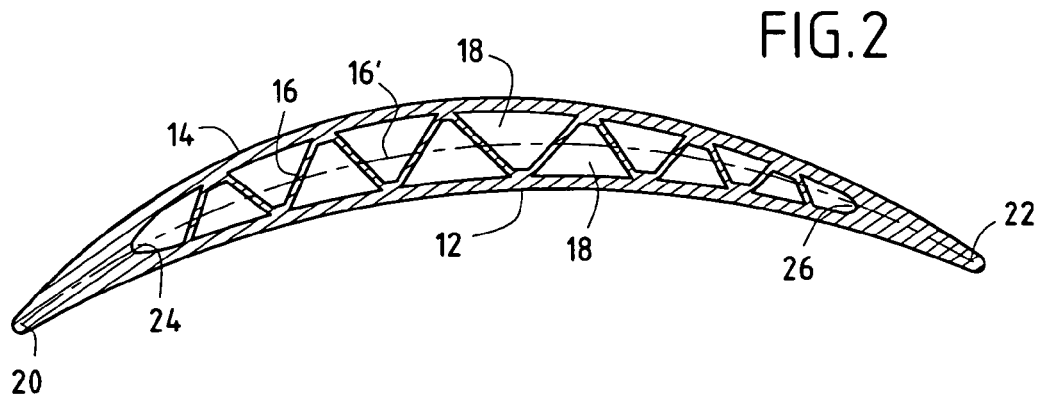
FIG. 2 is a diagrammatic cross-section view of the blade shown in FIG. 1.

FIGS. 1 and 2 show a hollow blade 10 for a turbomachine, in particular a large-chord fan blade for a two-flow turbojet, for example.

As can be seen more completely in the cross-section of FIG. 2, the blade 10 is made up of a pressure side skin 12, a suction side skin 14, and a spacer-forming central element 16.

As can be seen, the skins 12 and 14 are spaced apart so as to form an internal cavity 18 in which the central element 16 is located to form multiple stiffeners interconnecting the pressure side skin 12 and the suction side skin 14.

Before the diffusion-welding step, the central element 16 is in the form of a central sheet 16' represented diagrammatically by a chain-dotted line in FIG. 2.

The blade 10 results from an improved fabrication method constituting the subject matter of the present invention, with the pressure side skin 12 and the suction side skin 14 being diffusion welded together along their peripheries to form a leading edge 20 (on the left in FIG. 2) and a trailing edge 22 (on the right in FIG. 2). The internal cavity 18 of the blade 10 presents a curved section 24 beside the leading edge 20 and a curved section 26 beside the trailing edge 22.

Figure 3:
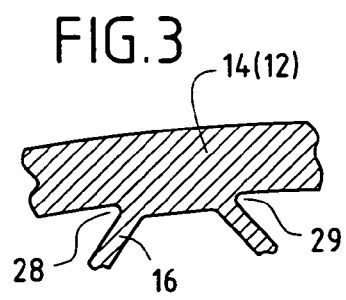
FIG. 3 shows the detail of a connection between two blade elements as shown in FIGS. 1 and 2.

As can be seen more clearly in FIG. 3, the spacer-forming central element 16 has surfaces that are welded to the pressure side skin 12 and surfaces that are welded to the suction side skin 14, thereby making connections between the stiffener-forming portions of the central element 16 and the skins 12 and 14, with curved sections 28 or 29.

In a first step a) of the fabrication method of the invention, the blade 10 shown in FIGS. 1 and 2 is made from three primary parts (a suction side primary part, the central sheet 16', and the pressure side primary part) which are obtained by forging, by press stamping, and then by machining for finishing purposes.

In following step b), diffusion barriers are deposited in a predefined pattern corresponding to the regions of the faces of the suction and pressure side primary parts that face the cavity 18 and that are not connected to the spacer-forming element 16.

Figure 4:
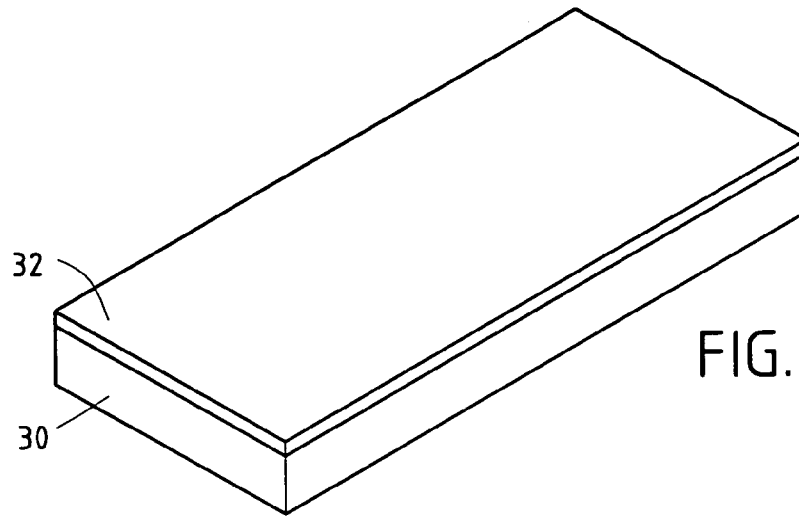
FIG. 4 shows the situation at the end of the first stage of depositing an anti-diffusion substance, i.e. after the anti-diffusion substance has been applied and while it covers the entire surface area of a primary part.
Figure 5:
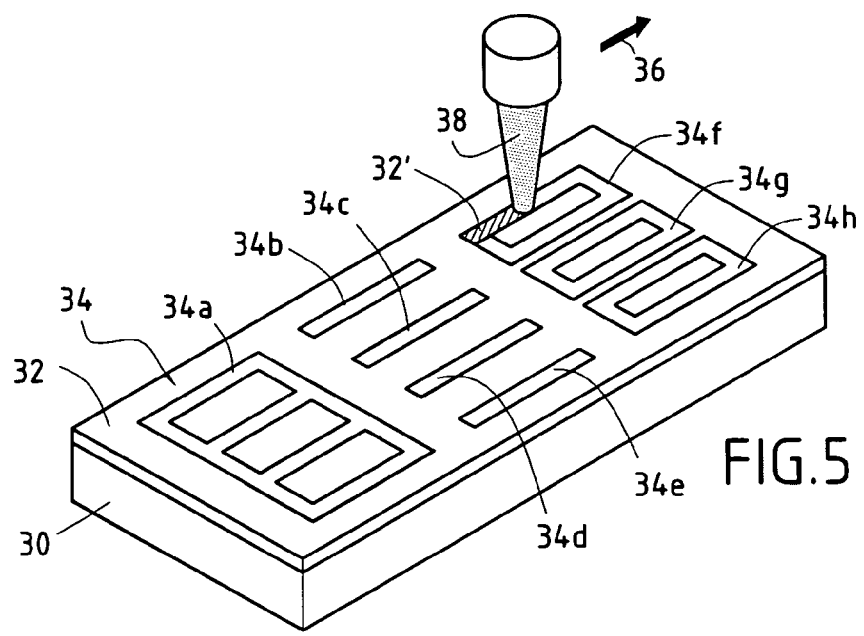
FIG. 5 shows the second stage of depositing an anti-diffusion substance, corresponding to localized application of a laser beam along a track, causing localized heating to occur leading to the anti-diffusion substance being sintered in said predefined pattern.
Figure 6:
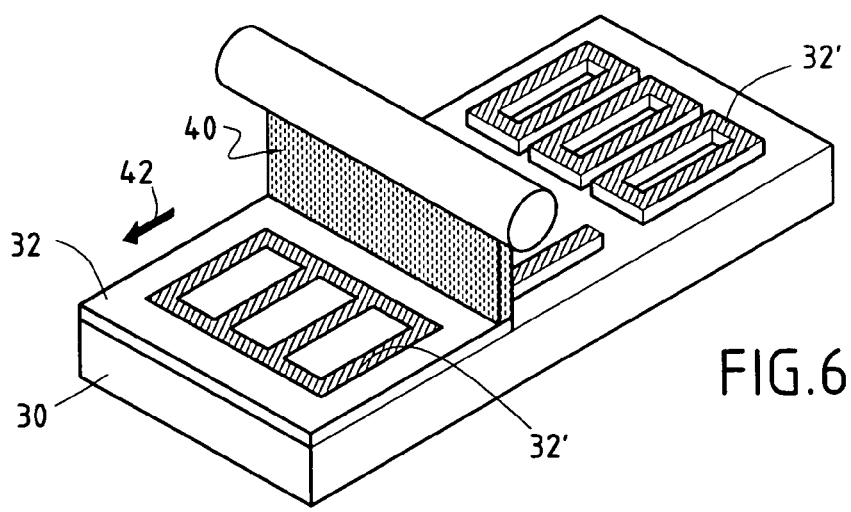
FIG. 6 shows the third stage of depositing an anti-diffusion substance, i.e. removing the anti-diffusion substance from those regions that have not been subjected to the laser beam.

In more detail, this step b) comprises the following sub-steps:

b1) applying a layer 32 of an anti-diffusion substance on one of said primary parts 30, the substance comprising a powder and being applied over the entire corresponding surface of the primary part 30, leading to the situation that can be seen in FIG. 4;

b2) localized sintering of the powder contained in the layer of anti-diffusion substance 32 in a predefined pattern 34 made up of zones 34a, 34b, 34c, 34d, 34e, 34f, 34g, and 34h (zones corresponding to the regions of the suction and pressure side primary parts that face the cavity 18 and that are not to be connected to the spacer-forming element 16), with sintering taking place along a track 36 and being performed by a laser beam 38 (see FIG. 5, where the zones 34a to 34h are of a shape that has been selected for illustrative purposes but that does not correspond to a shape that enables the particular bonding that is required between the suction or pressure side primary parts and the spacer-forming element 16); and b3) removing the layer 32 of anti-diffusion substance from the zones that have not been subjected to the laser beam 38 by using non-abrasive cleaning means 40 (FIG. 6).

When fabricating a blade 10 as shown in FIGS. 1 to 3, the step of depositing the anti-diffusion substance comprising the sequence of operations b1) to b3) and as described above with reference to FIGS. 4 to 6, is performed on at least two faces of the primary parts.

More exactly, at least one face from amongst the inside face of the pressure side primary part (which will become the pressure side skin 12) and the facing face of the central sheet 16', and at least one face from amongst the inside face of the suction side primary part (which will become the suction side skin 14) and the facing face of the central sheet 16', are subjected to deposition step b).

The purpose is naturally to provide bonding between the central sheet 16' and both the inside face of the pressure side primary part and the inside face of the suction side primary part, which inside faces face towards the cavity 18.

Specifically, the primary parts are made of a titanium-based alloy and the anti-diffusion substance is made up of a binder constituted by water and a powder which constitutes an anti-diffusion filler based on yttrium oxide.

With reference to FIG. 4, the anti-diffusion substance 32 is preferably applied to the primary part 30 by spraying, although other application techniques such as dipping or coating using a roller or a brush could also be used, providing the resulting assembly is capable of being handled, the adhesion of the anti-diffusion substance 32 nevertheless being low so that the substance can subsequently be removed from the face of the primary part that is carrying it merely by washing.

After sintering, it is desired to obtain a sintered anti-diffusion substance 32' that is at least 5 µm thick, the yttrium powder presenting particles having a mean size of about 5 µm (mean size lying in the range 3 µm to 7 µm, preferably in the range 4 µm to 6 µm, and more preferably substantially equal to 5 µm).

The laser beam 38 is adjusted so as to deliver sufficient energy to the layer of anti-diffusion substance 32 to sinter the particles of the powder forming the anti-diffusion filler, but without causing said powder to melt, while nevertheless creating a diffusion phenomenon between the sintered anti-diffusion substance 32 and the material constituting the face of the primary part 30 on which the layer of anti-diffusion substance 32 has been applied.

Furthermore, when the laser beam 38 goes past, the water forming the binder for the anti-diffusion substance is eliminated by evaporation. Nevertheless, if some other binder, in particular an organic binder were to be used, the heating due to the passage of the laser beam is sufficient to degrade that binder.

Naturally, the laser beam 38 should also be adjusted so as to avoid damaging and/or deteriorating the material of the primary part 30.

In order to outline the predefined pattern 34 with great accuracy and very straight lines, particularly along the outlines of the zones 34a to 34h, it is preferable for the laser beam 38 to begin its track 36 that is to cover all of the points in the zones 34a to 34h inside each of said zones so that the track is not begun near a border.

In this way, spot defects along the outlines of the zones 34a to 34h are avoided, thereby providing a sintered anti-diffusion substance 32' in a pattern that is very sharp and very accurately located.

Once all of the zones 34a to 34h have received sufficient energy from the laser beam 38 to sinter the anti-diffusion substance in the predefined pattern 34, the non-sintered remainder of said layer of anti-diffusion substance 32 is removed from the corresponding regions, i.e. the regions outside the pattern 34, by using cleaning means 40 that move over the entire surface of the primary part 30 (arrow 42 in FIG. 6).

Provision is made for the cleaning to be performed by means that perform washing with jets of water, it being understood that it is also possible to perform this cleaning by immersion in a solvent, by mechanical action (wiping, brushing, . . . ), or indeed by immersion in a liquid subjected to ultrasound.

Naturally, the cleaning means 40 are selected are not abrasive so as to avoid damaging the outlines of the sintered anti-diffusion substance 32'.

FIG. 7 shows more precisely the phenomenon of sintering by means of the laser beam 38 which provides energy to a sintered region 46 of the layer 32 so as to sinter particles of powder in said layer 32 and enable bonding to take place between said region 46 and a surface bonding region 48 of the primary part 30. This bonding between the regions 46 and 48 enables the powder particles of the sintered region 46 to be securely fixed onto the primary part 30, thereby obtaining a strong deposit of the anti-diffusion substance.

For this purpose, the laser beam 38 is moved so as to position the focus point of the beam in a focus region 50 containing the free face of the layer 32 of anti-diffusion substance.

FIG. 8 is a diagram of apparatus 52 for implementing the deposition step of the invention.

The laser beam 38 is driven by mechanical means 54 controlled by a computer interface 56.

The primary part 30 is fixed on a table 58, which table 58 can be positioned under the control of the computer interface 56 so as to ensure that the face of the primary part 30 always lies in the focal region 50 of the laser beam 38, thus also making it possible to perform the deposition operation on faces that are not plane.

The table 58 can be moved in an upstream to downstream direction 60 so as to be positioned in succession under a spray strip 62 for applying the layer of anti-diffusion substance 32, under the laser beam 38 during the second operation of deposition step b), and then under the cleaning means 40 constituted by a strip of water jet.

It is also necessary to dry the anti-diffusion substance 32 after it has been sprayed and before sintering it. Such drying (not shown) is performed at a temperature below 100° C. using one or more fans or a drying oven.

A configuration that is not shown consists in placing the apparatus 52 of FIG. 8 in an enclosure filled with an atmosphere of neutral gas such as argon, in order to avoid any contamination of the primary part 30.

The subsequent steps of the method of fabricating a hollow blade 10 (not shown) are performed in conventional manner:

c) the primary parts (pressure side primary part, central sheet 16', and suction side primary part) are stacked and then assembled together at their periphery with the exception of a passage-forming location;

d) the stack is welded by diffusion welding in an isostatic compression enclosure so as to obtain intimate bonding between the primary parts constituting the blade, with the exception of the locations of the above-mentioned passage and of the zones that are covered in the layer 32' of the sintered anti-diffusion substance;

e) the assembly as welded in this way is placed in a mold; and f) the primary parts constituting the blade 10 are formed under superplastic conditions by applying an inflation pressure (preferably using an inert gas) into the internal cavity 18 so as to obtain the desired shape, as shown in FIG. 2.

By depositing the anti-diffusion substance in accordance with the present invention, using sintering under a laser beam, it is guaranteed that an anti-diffusion substance 32' is used that is stable and that will not move nor deteriorate significantly while pressure is being applied in the diffusion-welding step.

Naturally, although the present invention is described with reference to fabricating a blade 10 that is obtained from three initial primary parts in the form of plates or sheets, the method can also be applied to a greater number of initial primary parts or merely to two only.

Likewise, hollow mechanical parts of other kinds can be made using the method of fabrication of the present invention, in particular wings, box beams, caps, struts, . . . or any other hollow mechanical part, possibly a structural part.

By way of example, the following conditions have been used for fabricating a hollow blade:

- the alloy of the medium, i.e. of the primary part 30 (pressure side or suction side): titanium alloy TA6V;
- anti-diffusion substance 32: a 50/50 mixture of yttrium oxide and water;
- the layer of anti-diffusion substance 32 applied by spraying; and
- density of the anti-diffusion substance layer 32 after deposition and drying: 5 milligrams per square centimeter (mg/cm$^2$) to 10 mg/cm$^2$.

The laser beam sintering operation has been performed under the following operating conditions:

- wavelength: short infrared;
- mean power: 5 watts (W) to 100 W;
- scanning speed: 50 millimeters per second (mm/s) to 3000 mm/s;
- frequency: 2 hertz (Hz) to 50 Hz;
- diameter of laser beam (at the point of focus): 10 μm to 200 μm; and
- thickness of the anti-diffusion substance after sintering: 10 μm to 25 μm.

What is claimed is:

1. A method of fabricating a hollow mechanical part by diffusion welding and superplastic forming, the method comprising the following steps:
   a) providing at least two primary parts of superplastic material, said primary parts having two faces and a periphery;
   b) providing an anti-diffusion substance and depositing said anti-diffusion substance in a predefined pattern on at least one face of said two faces of said primary parts;
   c) stacking-up and assembling said primary parts together at their said periphery, with the exception of a passage-forming location, said primary parts forming a stack and defining between them a cavity, said at least one face being placed facing into said cavity;
   d) diffusion welding the stack under isostatic pressure;
   e) placing the welded assembly in a mold; and
   f) raising said mold to the superplastic forming temperature and injecting an inert gas at the superplastic forming pressure via said passage into said cavity, thereby causing the stack to inflate and implementing superplastic forming, enabling a blank of the mechanical part to be obtained;
   wherein step b) is performed in application of the following sequence of operations:
     b1) applying a layer of anti-diffusion substance comprising a powder over the entire surface of said at least one face of the primary parts;
     b2) localized sintering of the anti-diffusion substance, without melting the powder, in said predefined pattern by the heating that results from localized application of a laser beam directly onto said powder along a track made up of at least one zone prior to the stacking-up, thereby producing, in said at least one zone, both bonds between the particles of powder and also a diffusion phenomenon between the particles of powder and the material of said at least one face of the primary part; and
     b3) removing the anti-diffusion substance from regions that are not subjected to the laser beam.

2. A method of fabrication according to claim 1, wherein said anti-diffusion substance comprises said powder and a binder, and wherein said powder is an anti-diffusion filler constituted by a refractory material comprising at least one of the materials belonging to the group constituted by: yttrium oxide; alumina; graphite; and boron nitride; or any other powder made of a material that is compatible with the superplastic material.

3. A method of fabrication according to claim 1, wherein said anti-diffusion filler is an yttrium oxide powder with particles presenting a mean size of less than 50 μm.

4. A method of fabrication according to claim 1, wherein said binder is water.

5. A method of fabrication according to claim 1, wherein step b1) of applying a layer of anti-diffusion substance is performed by spraying.

6. A method of fabrication according to claim 1, wherein step b2) of sintering is performed under an atmosphere of inert gas.

7. A method of fabrication according to claim 1, wherein said step b3) of removing said anti-diffusion substance is performed by washing.

8. A method of fabrication according to claim 1, wherein said laser is moved by a computer-controlled drive system.

9. A method of fabrication according to claim 8, wherein, for each zone, said drive system begins the path of the corresponding portion of the track inside said zone.

10. A method of fabrication according to claim 1, wherein said mechanical part is a hollow blade for a turbomachine and wherein in step a), three primary parts are provided comprising a suction side primary part, a central sheet, and a pressure side primary part.

11. A method of fabrication according to claim 6, wherein said inert gas is argon.

12. A method of fabrication according to claim 7, wherein said step b3) of removing said anti-diffusion substance is performed by brushing.

13. A method of fabrication according to claim 10, wherein said mechanical part is a fan rotor blade.

14. The method of fabricating according to claim 1, wherein the localized sintering of the anti-diffusion substance occurs before the diffusion welding of the stack under isostatic pressure.

15. The method of fabricating according to claim 1, wherein the removing of the anti-diffusion substance occurs before the diffusion welding of the stack under isostatic pressure.

16. The method of fabricating according to claim 1, wherein the localized sintering of the anti-diffusion substance occurs before the assembly of the primary parts together at their periphery.

17. The method of fabricating according to claim 1, wherein the superplastic forming is performed in the at least one zone to which the laser was directly applied.

18. The method of fabricating according to claim 17, wherein the superplastic forming is performed only in the at least one zone to which the laser was directly applied.

19. The method of fabricating according to claim 1, wherein the diffusion welding of the stack under isostatic pressure includes welding the stack to join the primary parts, in the regions that were not subjected to the laser beam, when the regions are free of anti-diffusion substance.

20. A method of fabricating a hollow mechanical part by diffusion welding and superplastic forming, the method comprising the following steps:
   a) providing at least two primary parts of superplastic material, said primary parts having two faces;

b) depositing an anti-diffusion substance in a pattern on at least one face of said two faces of said primary parts;

c) stacking-up and assembling said primary parts together to form a stack and a cavity between said primary parts, said at least one face being placed facing into said cavity;

d) diffusion welding the stack under isostatic pressure;

e) placing the welded stack in a mold; and f) raising said mold to a forming temperature and injecting an inert gas at a forming pressure into said cavity, thereby causing the stack to inflate, wherein said anti-diffusion substance comprises a powder and step b) comprises localized sintering of the anti-diffusion substance by applying a laser beam directly onto said anti-diffusion substance along a track prior to the stacking-up, thereby fixing said anti-diffusion substance on said at least one face without melting the powder.

21. The method of fabricating according to claim 20, further comprising:

removing the anti-diffusion substance from regions that are not subjected to the laser beam.

22. The method of fabricating according to claim 20, wherein the localized sintering of the anti-diffusion substance occurs before the diffusion welding of the stack under isostatic pressure.

23. The method of fabricating according to claim 20, wherein the superplastic forming is performed in an area of the track where the laser was directly applied.

24. The method of fabricating according to claim 20, wherein the diffusion welding of the stack under isostatic pressure includes welding the stack to join the primary parts in regions of the track free of anti-diffusion substance.

25. A method of fabricating a hollow mechanical part by diffusion welding and superplastic forming, the method comprising the following steps:

a) providing at least two primary parts of superplastic material, said primary parts having two faces and a periphery;

b) providing an anti-diffusion substance and depositing said anti-diffusion substance in a predefined pattern on at least one face of said two faces of said primary parts, said providing including, b1) applying a layer of anti-diffusion substance comprising a powder over the entire surface of said at least one face of the primary parts, b2) localized sintering of the anti-diffusion substance in said predefined pattern by the heating that results from localized application of a laser beam directly onto the powder along a track made up of at least one zone, thereby producing, in said at least one zone, both bonds between the particles of powder and also a diffusion phenomenon between the particles of powder and the material of said at least one face of the primary part, and b3) removing the anti-diffusion substance from regions that are not subjected to the laser beam;

c) after the localized sintering, stacking-up and assembling said primary parts together at their said periphery, with the exception of a passage-forming location, said primary parts forming a stack and defining between them a cavity, said at least one face being placed facing into said cavity;

d) after the localized sintering of the anti-diffusion substance, diffusion welding the stack under isostatic pressure;

e) placing the welded assembly in a mold; and f) raising said mold to the superplastic forming temperature and injecting an inert gas at the superplastic forming pressure via said passage into said cavity, thereby causing the stack to inflate and implementing superplastic forming, enabling a blank of the mechanical part to be obtained.

26. The method of fabricating according to claim 25, wherein the superplastic forming is performed in the at least one zone to which the laser was directly applied.

27. The method of fabricating according to claim 25, wherein the diffusion welding of the stack under isostatic pressure includes welding the stack to join the primary parts, in the regions that were not subjected to the laser beam, when the regions are free of anti-diffusion substance.

\* \* \* \* \*